United States Patent [19]
Hornung et al.

[11] Patent Number: 4,673,318
[45] Date of Patent: Jun. 16, 1987

[54] HAND TOOL MACHINE, IN PARTICULAR DRILLING MACHINE

[75] Inventors: Friedrich Hornung; Kurt Paule, both of Stuttgart; Fritz Schädlich, Leinfelden-Echterdingen, all of Fed. Rep. of Germany

[73] Assignee: Robert Bosch GmbH, Stuttgart, Fed. Rep. of Germany

[21] Appl. No.: 531,592

[22] Filed: Sep. 12, 1983

[30] Foreign Application Priority Data

Oct. 7, 1982 [DE] Fed. Rep. of Germany ....... 3237158

[51] Int. Cl.$^4$ .......................... B23B 45/02; H02P 7/28
[52] U.S. Cl. ........................................ 408/9; 173/170; 408/3
[58] Field of Search .................. 29/264, 568; 173/170; 33/181 R; 408/1, 3, 4, 6, 8, 9, 16

[56] References Cited
U.S. PATENT DOCUMENTS
3,817,647 6/1974 Lemelson ........................... 408/6 X

FOREIGN PATENT DOCUMENTS
758135 9/1956 United Kingdom ................. 29/568

Primary Examiner—Z. R. Bilinsky
Attorney, Agent, or Firm—Michael J. Striker

[57] ABSTRACT

A hand tool machine, in particular a drill machine, has a feeler device for determining the diameter of a tool element to be used with the hand tool machine. For measuring the tool elements prior to insertion into the clamping element of the hand tool machine, a feeler device is provided which is arranged separately from the clamping element and is connected with an indicator. The diameter determined by the feeler device is administered to a control unit which is controlling the driving motor. The control unit can also receive in addition further information concerning the material to be treated by means of an input device. In view of the measuring value with regard to the diameter of the tool element and the administered information concerning the material, the optimum rotary speed for the tool element and consequently for the driving motor is determined and adjusted.

45 Claims, 13 Drawing Figures

HAND TOOL MACHINE, IN PARTICULAR DRILLING MACHINE

BACKGROUND OF THE INVENTION

The invention relates to a hand tool machine, in particular to a drilling machine.

In European patent application No. 0,018,465, the hand tool machine is provided with a feeler device for determining the diameter of tool elements used in the hand tool. The position of the chuck jaw of a drilling chuck is determined by a feeler to provide a value which is transmitted to a control unit for the motor of the hand tool machine. The rotational speed of this motor is controlled corresponding to the indirectly determined shank diameter of the tool element inserted into the chuck.

This principle seems to be rather sound. However, it possesses some disadvantages which reside primarily in the determination of the diameter by analyzing the position of the chuck jaw. Since it frequently happens that the drill shanks are stepped and the drill bits have cutting edges projecting radially beyond the diameter of the actual drill body (hard metal drill), the determined shank diameter does not correspond to the working diameter of the drill bit. Consequently, wrong settings are unavoidable. Moreover, the hand, tool machine according to European patent application 0,018,465 provided with such a control device does not provide the operator with information about the diameter of the inserted drill bit.

SUMMARY OF THE INVENTION

It is a general object of the invention to overcome the difficulties of the prior art.

More particularly, it is an object of the invention to provide a hand tool machine which permits the determination of the diameter of a tool element in an accurate way, so that the motor of the hand tool machine runs in an optimum manner.

Yet another object of the invention is to provide a hand tool machine which allows the reading of the determined diameter of the tool element to be inserted.

A concomitant object of the present invention is to provide a hand tool machine which is simple in construction, reliable in operation and inexpensive to manufacture nevertheless.

In keeping with these objects and with others which will become apparent hereinafter, one feature of the invention resides in a hand tool machine, comprising a frame, a clamping element connected to the frame and receiving a tool element, means for driving the tool element, means for determining the diameter of the tool element, the determining means being arranged separately form the clamping element, and means for controlling the driving means in dependence on the determined diameter.

According to a first embodiment of the invention, the determining means includes a caliper provided with a scale and a reference dimension for indicating the position of the caliper so as to determine the diameter of the tool elements, wherein the caliper is provided at an exposed portion of the frame. Through the provision of a scale and a reference mark, the operator is able to immediately read the position of the caliper once a tool element is inserted and therefore to determine the diameter of the tool element. The caliper is associated with an electronic odometer which provides an output to the motor control corresponding to the determined diameter.

According to another feature of the invention, the determining means includes a first member connected to the frame and having at least one opening, and a second member movable with respect to the first member and having at least a further opening cooperating with the one opening so as to allow the tool element to be inserted through the one and the further opening and to determine the diameter of the tool element depending on further movement of the second member with respect to the first member. The first and the second member are associated with a resistance meter having a resistance bar and a sliding contact sliding on the bar so that, depending on the relative movement between the first and second member, the sliding contact slides on the bar and provides a respective resistance value corresponding to the diameter of the tool element. According to another embodiment of the invention, the determining means includes an inductive arrangement for determining the diameter of the tool element.

The hand tool machine according to the invention has the advantage that the working diameter of the tool element, e.g. of the drill bit, can be administered into the hand tool machine prior to the insertion of the drill bit and can be indicated so as to provide the operator with corresponding information. Through the provision of determining means for the diameter separated from the chuck jaw of the hand tool, the actual working diameter of the tool element can be determined in a fast and accurate manner. Consequently, the insertion of the tool element which takes some time in prior-art hand tool machines and the sometimes necessary disassembling of the tool element is avoided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
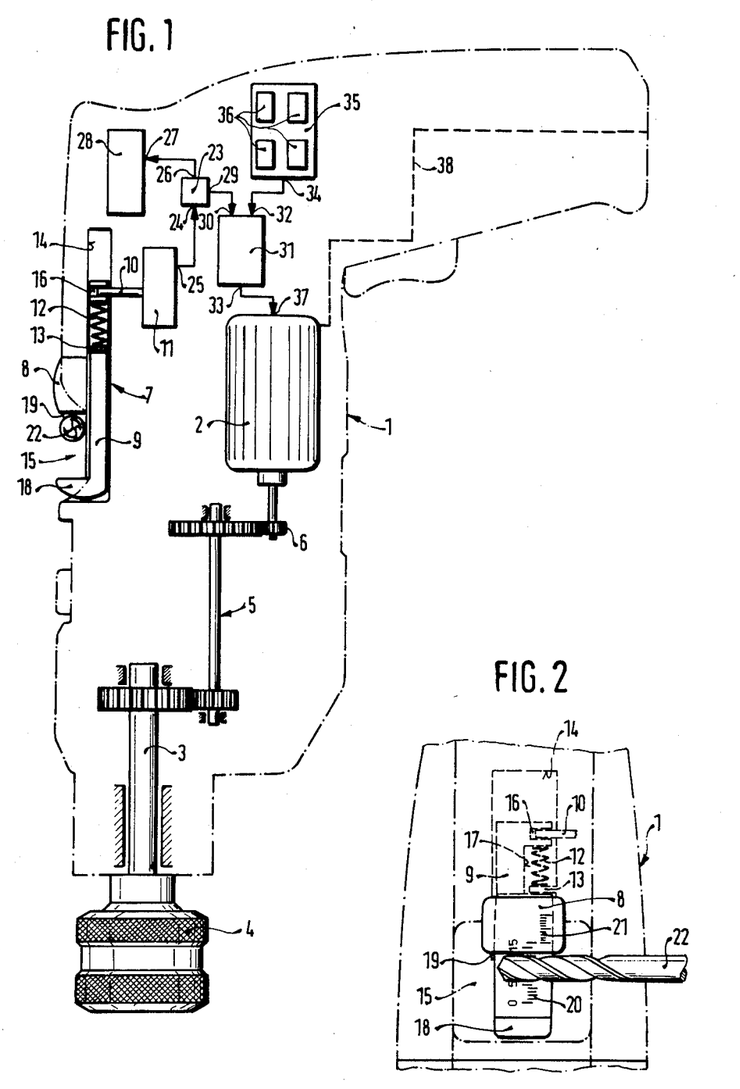
FIG. 1 is a first embodiment of the present invention illustrating a hand tool machine provided with a caliper and associated control means.
FIG. 2 is a partial view of the caliper according to FIG. 1.

FIG. 1, which refers to a first embodiment of the invention, illustrates a hand tool machine 1, e.g., a hand drill machine, having a housing 1a illustrated only in dash-dot lines. Within the housing 1a, a motor 2 is arranged for driving a drill spindle 3 which is provided with a drill chuck 4. The motor 2 is connected to the drill spindle 3 via a gearing 5 which is driven by a motor pinion 6.

At an exposed location of the frame 1a, the hand drill machine 1 is provided with a feeler device 7 for determining the diameter of a tool element to be inserted into the drill chuck 4. The feeler device 7 includes a caliper 9 having a first jaw 18 which is movable relative to a second jaw 8 which is developed as a magnifying lens. Associated with the feeler device 7 is a measuring value storage and transmitter 11 which is connected to the caliper 9 by means of a rod 10. The caliper 9 is provided with a recess 17 in which a pressure spring 12 is located having one end abutting the caliper 9 and another end resting on a block 13 of the housing 1a. The housing 1a of the hand tool machine forms also a sliding guide 14 which at 15 is open towards the outside. The rod 10 has one end projecting into a slot 16 of the caliper 9 and another end guided within the measuring value transmitter storage 11. The pressure spring 12 is so dimensioned that it forces the caliper 9 in its neutral position in which the one jaw 18 abuts the measuring surface 19 of the other jaw or stop member 8. The neutral position in which the spring 12 forces the caliper in its neutral position corresponds to the switched-off position for the electric current supply.

The measuring jaw 18, which constitutes the one end of the caliper 9 remote from the pressure spring 12, projects outwardly through the opening 15 of the housing 1a of the hand tool machine 1. The caliper 9 is provided with a scale 20 on its surface exposed to the outside. A vernier 21 is associated with the scale 20 and is provided on the face of the stop member 8 facing the surface of the caliper 9 which is exposed to the outside.

In FIGS. 1 and 2, the caliper 9 is retracted into its other end position with respect to its neutral position, so that the distance between the measuring jaw 18 and the measuring surface 19 of the stop member 8 corresponds to the provided measuring range of the caliper 9. Between the measuring jaw 18 and the measuring surface 19, e.g. a drill bit 22 can be inserted so that upon releasing of the caliper 9 the cutting edges of the drill bit 22 determine the distance of the measuring jaw 18 and the measuring surface 19.

The measuring value transmitter storage 11 is further associated with a distributor 23 which has an input 24 connected with the output 25 of the measuring value transmitter 11. A first output 26 of the distributor 23 is connected to an input 27 of an indicator 28 which displays the measured diameter in a digital manner. A second output 29 of the distributor 23 is connected to an input 30 of a control unit 31 which is provided with a further input 32 connected to an output 34 of an input device 35 which is provided with several input keys 36, each of which corresponds to a definition for the material to be treated by the tool element. The control unit 35 has further an output 33 which is connected to an input 37 of the motor 2. The electric connection of an energy supply line via a push switch to the motor 2 is indicated through dash-dot lines 38.

For measuring and administering the measured value into the control unit 31, the drill bit 22 is positioned in the shown manner between the measuring jaw 18 and the measuring surface 19 of the stop member 8. As soon as the measuring jaw 18 contacts the drill bit, which rests on the measuring surface 19, the value corresponding to the working diameter of the drill bit 22 can be read by means of the vernier at the scale 20. The obtained position of the caliper 9 is transmitted via the rod 10 to the measuring value transmitter storage 11 which transmits a corresponding analog or digital value to the distributor 23. The measuring value is stored in the measuring value transmitter storage 11 until the caliper 9 is retracted into its neutral position and again used for measuring the diameter of another tool element.

The value as transmitted to the distributor 23 is furnished to the indicator 28 which displays the same measuring value in a digital manner. The distributor 23 further transmits the administered value to the control unit 31, in which also the information is considered which is administered by the input device 35 and transmitted to the control unit 31. Accordingly, the control unit 31 provides an output signal which controls the motor 2 in an optimum manner.

An operator using the hand drill machine according to FIG. 1 is able to determine the diameter of the tool element to be used by the scale 20 and the vernier 21. Since the stop member 8 is provided as a magnifying lens, the reading of the position of the vernier 21 with respect to the scale 20 is facilitated. It is to be noted, however, that both indications of the determined diameter can be used individually. In this case, either the scale 20, the vernier 21 and the provision of the stop member 8 as a magnifying lens, or the indicator 28, can be deleted. It is further possible to use solely the feeler device 7 and the indicating unit of scale 20 in vernier 21 and to delete the direct input of the determined value into the motor control. Under these circumstances, the adjustment of the rotational speed must be manually carried out in a known manner.

Figure 3:
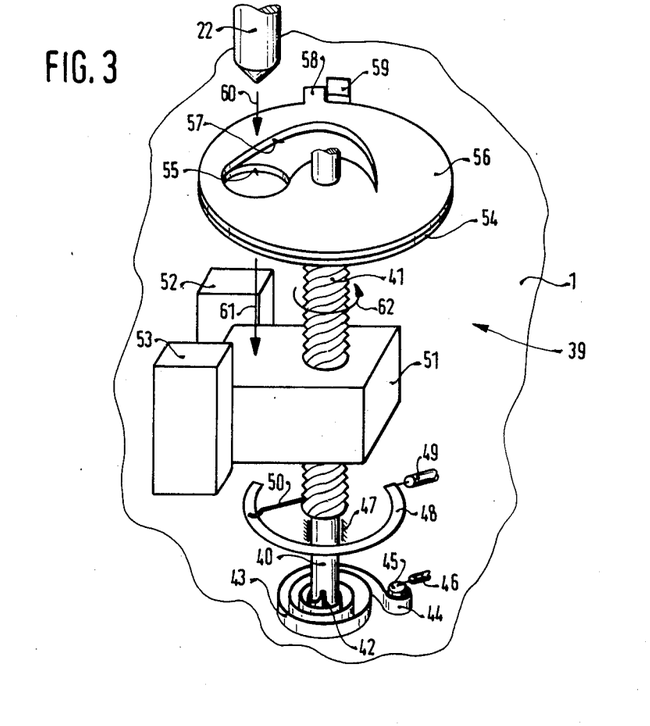
FIG. 3 is a second embodiment of the present invention illustrating only the determining means for the diameter in a perspective illustration and to be used in a hand tool machine.

In the embodiment according to FIG. 3, the feeler device 7 is replaced by a feeler device 39. In the housing of the hand drill machine 1, a spindle 14 is supported provided with a core thread 41. The spindle 14 is rotatably mounted but cannot be moved in axial direction. The lower end of the spindle 14 is provided with a slot 42 in which the one end of a helical spring 43 engages. The other end of the helical coil 43 is formed as an eye 44 surrounding a pin 45 fixed to the housing of the hand drill machine 1. Connected to the pin 45 is a table of which only the respective end 46 is shown and symbolizes the connection to an electric circuit. Above the helical coil 43, a resistance bar 48 is arranged fixed to a support 47 for the spindle 40. The end of the resistance bar 48 is connected with a cable end 49 which symbolizes the connection of the resistance bar 48 to a measuring value transmitter storage corresponding to the measuring value transmitter storage 11 according to FIG. 1. Fixedly connected to the spindle 40 is a sliding contact 50 which rests on the resistance bar 48 and can slide over the entire length thereof.

As can be further seen from FIG. 3, a pusher 51 is screwed on the coarse thread 41 and is movable in direction of the longitudinal axis of the spindle 14 by sliding pieces 52 and 53, but is prevented from rotation about the longitudinal axis of the spindle 40. Located above the coarse thread 41, the spindle 40 projects through a disk 54 which is provided with an opening 55 above the pusher 51 and is fixed to the housing. Coaxial with and located above the disk 54 is a further disk 56 which is fixedly connected with the spindle 40. The disk 56 is provided with a wedge-shaped tapering opening 57 arranged symmetrically to a line defined by an arc of a circle around the longitudinal axis of the spindle 14. The symmetric line of the opening 57 extends through the center axis of the opening 55 provided in the disk 54. A projection 58 of the disk 56 cooperates with a stop 59 fixed to the housing and together define the end position of the disk 56 and consequently of the spindle 14. The helical coil 43 forces the spindle 40 into this end position in which the end of opening 57 and the opening 55 are in alignment.

A drill bit 22 guided in the direction of arrows 60 and 61 through the openings 57, 55 impinges the respective surface of the pusher 51. Upon exerting pressure with the drill bit 22 onto the pusher 51, the spindle 14 is rotated through the pusher 51 via the coarse thread 41 against the tension of the helical coil 43 in direction of arrow 62. The rotational movement of the spindle 40 is terminated as soon as the tapering opening 57 and the opening 55 clamp the drill bit 22. During the rotational movement of the spindle 14, the sliding contact 50 is slid along the resistance bar 48 and occupies a certain position after termination of the rotational movement of the spindle which position corresponds to the diameter of the drill bit 22. The resistance value obtained through the movement of the sliding contact 50 on the resistance bar 48, and its distance to the cable end 49, corresponds to the drill bit diameter which, according to the embodiment of FIGS. 1 and 2, can be used for display of the drill bit diameter and for control of the motor 2.

Figure 4:
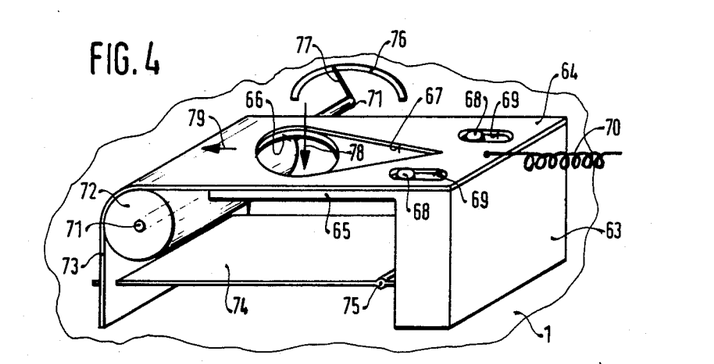
FIG. 4 is a third embodiment of the determining means for the diameter in perspective illustration.

The embodiment according to FIG. 4 corresponds in principle to the embodiment as shown in FIG. 3. An angle guide 63 fixed to the housing of the hand drill machine 1 supports a flexible band 64. The free shank 65 of the angle guide 63 is provided with a circular opening 66 which is in alignment in the end position with the end of an opening 67 provided in the band 64. The opening 67 tapers in wedge-shaped manner from a circle and extends symmetrically to a straight line provided in movement direction of the band 64.

The angle guide 63 is provided with two pins 68 spaced from each other along the width of the angle guide 63 and engage in elongated slots 69 of the band 64. The one end of the band 64 is connected to a tension spring 70 which tends to keep the band 64 in its end position. The other end of the band 64 is guided around a deflection roller 72 which is supported by a shaft 71 connected to the housing. Through the deflection roller 72, the band 64 is bent about 90°. The bent end 73 of the band 64 is fixedly connected to one end of a swivelling plate 74 whose other end is supported by a hinge 75 supported in the housing of the hand drill machine. The shaft 71 projects beyond the deflection roller 72 and is connected to a sliding contact 77 corresponding to the sliding contact 50 of FIG. 3 moved along a resistance bar 76 which corresponds to the resistance bar 48 of FIG. 3.

A drill bit guided in direction of arrow 78 through the openings 66 and 67 impinges the swivelling plate 74. Upon exerting pressure on the swivelling plate 74 by the drill bit 22, the band 64 is moved against the influence of the tension spring 70 in direction of arrow 79. As outlined with regard to the embodiment of FIG. 3, the movement terminates upon clamping of the drill bit 22. The rotational movement of the deflecting roll 72 with the shaft 71 is the criterion for the drill bit diameter, which criterion is electrically provided through the resistance determined by the movement of the sliding contact 77 on the resistance bar 76.

Figure 5:
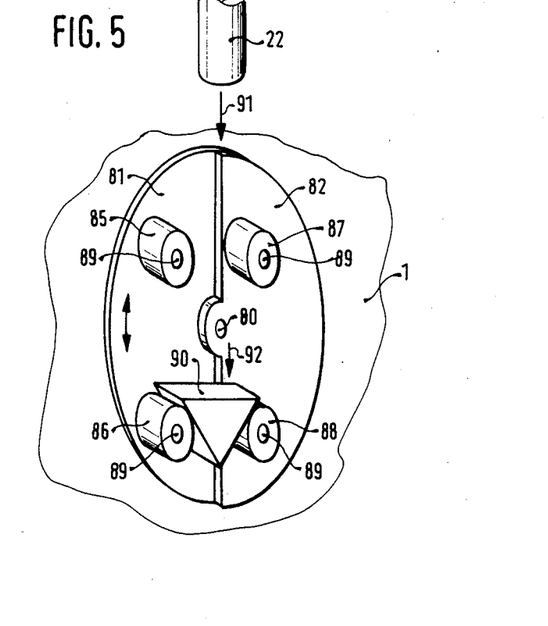
FIG. 5 is a fourth embodiment of the determining means in perspective illustration using no spring means.
Figure 5A:
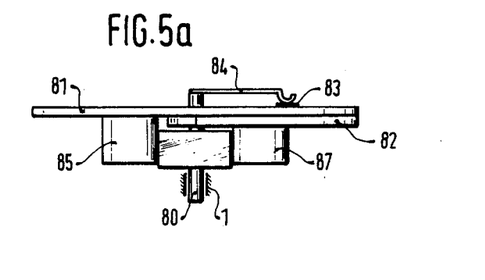
FIG. 5a is a side view of the determining means of FIG. 5.

In the embodiment according to FIGS. 5 and 5a, a shaft 80 is supported in the housing of the hand drill machine 1. The shaft 80 supports a circular disk 81 and a semicircular disk 82, whereby both disks 81 and 82 tightly lie against each other. The surface of the disk 81 which does not face the semicircular disk 82 is provided with a resistance bar 83. A sliding contact 84 which is fixedly connected to the end of the shaft 80 slides along the resistance bar 83. Each of the disks 81, 82 is provided with two rollers 85, 86; 87, 88, whereby each roll is rotationally supported on pins 89. The roller 85 of the disk 81 and the roller 87 of the disk 82 are located above the shaft 80 and oppose each other, and in the same manner the respective rollers 86 and 88 are located below the shaft 80 and oppose each other. Between the rollers 86 and 88, a wedge 90 is inserted whose tip points downwardly, that is in direction of the shaft 80.

A drill bit guided in direction of arrows 91 and 92 and inserted between the rollers 8 5 and 87 forces these rollers outwardly. Consequently, the disk 81 and the semicircular disk 82 rotate around the shaft 80, thereby moving the rollers 86 and 88 closer together. The wedge 90 is therefore raised. Upon exerting pressure on the wedge 90 by the end of the drill bit 22, the rollers 86 and 88 are pressed apart again. This action is possible as long as clearance is provided between the rollers 85 and 87, on the one hand, and the drill bit 22, on the other hand. In case both rollers 85 and 87 tightly abut the drill bit 22, the inserting movement of the drill bit 22 is terminated. The drill bit diameter is determined as explained in the previous embodiments of FIGS. 3 and 4 by the movement of the sliding contact 84 on the resistance bar 83. In contrast to the embodiment as shown in FIGS. 3 and 4, the embodiment according to FIG. 5 does not need any springs for providing the measurement.

The embodiments according to FIGS. 6-9 are provided for the gradual determination of drill bit groups of different diameter within the respective group.

Figure 6:
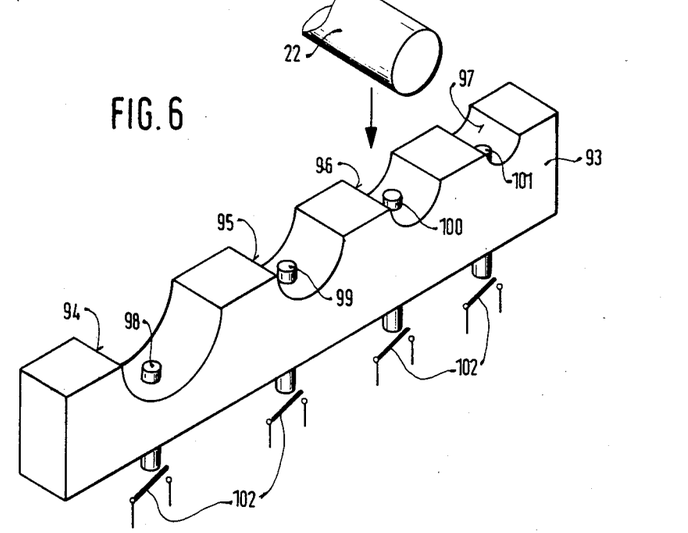
FIG. 6 is an embodiment of the present invention for classifying tool elements in different groups with diameters approved within such a group.

In the embodiment of FIG. 6, there is shown a gauge 93 provided at the housing of the hand drill machine, which gauge 93 has semicircular recesses 94–97. These recesses are gradually stepped between a largest diameter and a smallest diameter. Projecting into each of the recesses 94–97 is one end of a respective switch pin 98–101. The other end of each switch pin 98–101 can be brought into engagement with electrical switches 102 which can be closed upon depression of the respective switch pin.

For measuring and determining, respectively, the drill bit 22 is first tried to be inserted into the recess of smallest dimension, i.e. recess 97. In case the drill bit 22 can be inserted into this recess 97, the switch pin 98 is depressed and closes the underlying switch 102, so that the drill bit 22 belongs to the group associated to this recess. In case the switch pin 98 cannot be depressed because the recess 97 is of a dimension too small for the drill bit, the following recess 96 of larger diameter must be tried; and so on.

Figure 7:
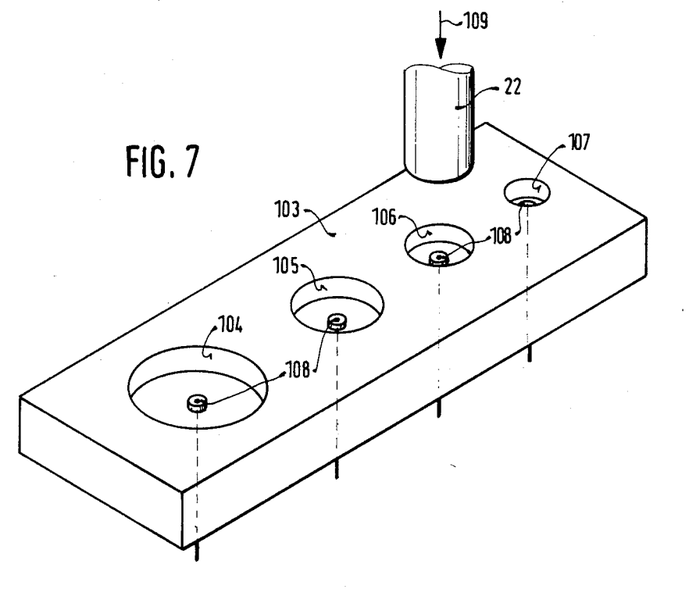
FIG. 7 is a further embodiment for determining the diameters in groups.

In the embodiment of FIG. 7, a gauge 103 is fixed to the housing of the hand drill machine 1. The gauge 103 is provided with cylinder-shaped recesses 104–107 instead of the recesses 94–97 of the embodiment of FIG. 6. In each of the cylinder-shaped recesses 104–107 there projects a contact pin 108 whose other end is engageable with a switch according to FIG. 6. A drill bit 22 moved in direction of arrow 109 can contact or depress a respective contact pin only when the drill bit 22 has a diameter small enough to be entered into the respective cylinder-shaped recess. In case the drill bit 22 can be inserted into the respective recess, this means that this drill bit belongs to the group associated therewith. Otherwise, the next recess of larger diameter has to be used, and so on. The measurement has to be carried out in the same manner as explained with regard to the embodiment according to FIG. 6.

Figure 8:
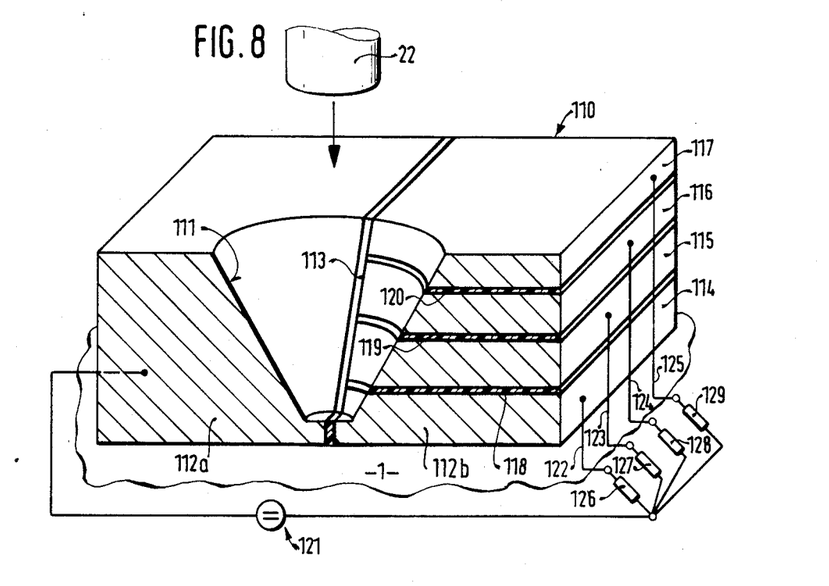
FIG. 8 is a still further embodiment for determination in groups by means of a gauge with a cone-shaped indentation in perspective illustration.

In the embodiment of FIG. 8, a gauge 110 is arranged in the housing of the hand drill machine 1, which gauge 110 is provided with a cone-shaped indentation 111. The gauge 110 is divided into two sections 112a, 112b. The section 112a of the gauge 110 is developed in one piece and is separated from the other section 112b by an insulating layer 113 extending in axial direction of the cone-shaped indentation 111. The second section 112b of the gauge 110 is arranged in layers of four electrically conducting portions 114–117 separated from each other with interposed insulating layers 118–120. An electrical connection of a measuring circuit 121 is provided on the one hand to the one-piece portion 112 of the gauge 110, and on the other hand to each of the portions 114–117. The portion 114 is provided with a connection 122, the portion 115 with a connection 123, the portion 116 with a connection 124, and the portion 117 with a connection 125. The connections 122–125 are connected to the measuring circuit 121 via respective resistances 126–129 of different dimension. Depending on the diameter of a drill bit 22 inserted in the cone-shaped indentation 111, the measuring circuit is closed from the section 112 to one of the portions 114–117. In correspondence to the respective drill bit diameter, signals are directly digitally provided at the respective connection 122–125.

Figure 9:
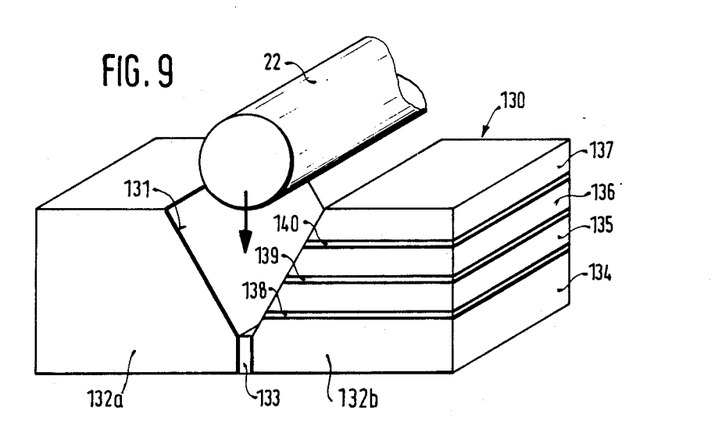
FIG. 9 is another embodiment for the determination in groups of diameters of tool elements showing a gauge in perspective illustration provided with a wedge-shaped indentation.

The embodiment of FIG. 9 operates essentially as does the embodiment of FIG. 8, except that instead of the gauge 110 a gauge 130 is used having a wedge-shaped indentation 131 instead of a cone-shaped indentation 111. The gauge 130 is provided with a one-piece section 132a and another section 132b which is separated therefrom by an insulating layer 133 and is provided with layers 134–137 separated from each other by interposed insulating layers 138–140. In this gauge 130, a drill bit 22 can be inserted either vertically or horizontally into the wedge-shaped indentation. The measurement corresponds to the measurement as explained with regard to the embodiment shown in FIG. 8.

Figure 10:
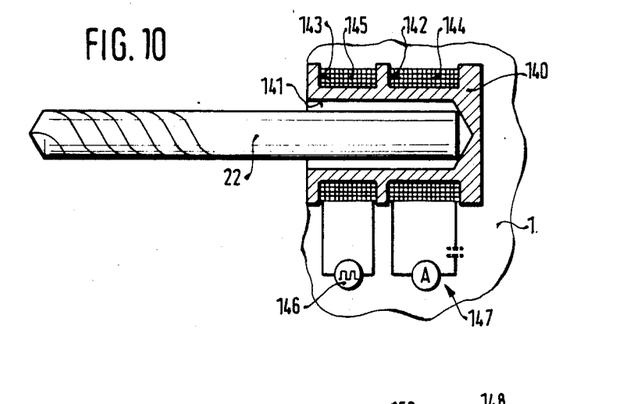
FIG. 10 is a further embodiment of the invention using an inductive arrangement for determining the tool element diameter through high-frequency coupling.
Figure 11:
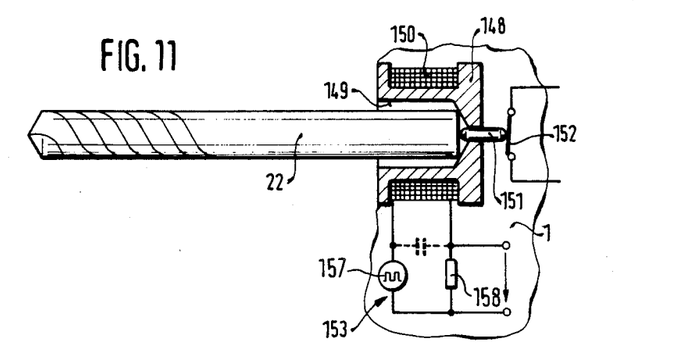
FIG. 11 is another embodiment for inductive determination of the tool element diameter through damping.
Figure 12:
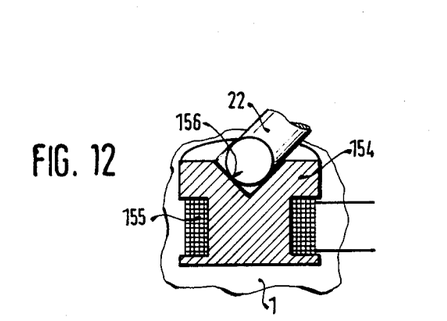
FIG. 12 is still another embodiment, corresponding to FIG. 11 but with modified structure.

The embodiments according to FIGS. 10–12 refer to inductive measuring arrangements.

In the embodiment according to FIG. 10, a support body 140 is provided in the housing of the hand drill machine 1. The support body 140 defines a cylindrical cavity 141 and has an outer surface provided with two winding spaces 142, 143 in which two coils 144, 145 are wound. The coil 145 is connected to an AC voltage source 146, while the coil 144 is connected to a measuring circuit 147. The high-frequency coupling between both coils 144, 145, which is determined by the measuring circuit 147, is a measure of the diameter of the drill bit 22 inserted into the cylindrical cavity 141.

In the embodiment of FIG. 11, a support body 148 is provided in the housing of the hand drill machine 1 and defines a cavity 149 in which the drill bit 22 is to be inserted upon measurement of the diameter. The support body 148 has an outer surface provided with a winding space for a coil 150 which is connected to an AC voltage source 153. Projecting into the cavity 149 of the support body 148 is one end of a control pin 151 whose other end is engageable with a switch 152 for closing the latter. With the switch 152, a supply voltage, e.g., for the high-frequency generator 157, can be switched to a storage. This is provided in a desired manner always momentarily and only when the measuring signal is actually required. A drill bit 22 inserted into the cavity 149 changes the inductivity or damping, respectively, in the coil 150 and therefore the measuring value at the resistance 158. The size of the change corresponds to the diameter of the tool element to be measured.

In the embodiment of FIG. 12, instead of support body 148 a support body 154 is embedded into the housing of the hand drill machine 1. This support body 154 is provided with a winding space receiving a coil 155 which is switched in the same manner as the coil 150 in the embodiment according to FIG. 11. The support body 154 is provided with a wedge-shaped cut-out 156 in which the drill bit 22 is inserted. Depending on the diameter, the drill bit 22 penetrates more or less deeply into the cut-out 156 and changes the inductivity or damping, respectively, of the coil 155 in corresponding manner.

It will be understood that each of the elements described above, or two or more together, may also find a useful application in other types of hand tool machines differing from the types described above.

While the invention has been illustrated and described as embodied in a hand tool machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims;

We claim:

1. A hand tool machine for driving a tool element having a diameter, comprising: a housing; a clamping element connected to said housing for receiving the tool element; means for driving the tool element; means for determining the diameter of the tool element with a changeable speed, said determining means including a feeler member, which is arranged to receive the tool element for sensing the diameter of the tool element, said determining means with said feeler member being located at a predetermined part of said housing separate from said clamping element so as to determine the diameter of the tool element when the latter is not received in said clamping element so that the determination of the diameter of the tool element takes place directly in the housing and at the same time separately from said clamping element; and controlling means connected with said feeler member and for controlling said driving means so as to change the speed of said driving means and thereby to change the speed of the tool element in dependence on the diameter determined by said feeler member.

2. A hand tool machine as defined in claim 1, and further comprising a readable indicator associated with the determining means.

3. A hand tool machine as defined in claim 1, wherein the determining means includes a caliper provided with a scale and a reference mark for indicating the position of the caliper so as to determine the diameter of a tool element, the caliper being provided at an exposed portion of the housing.

4. A hand tool machine as defined in claim 3, wherein the reference mark is a vernier for accurately reading the position of the caliper and to accurately determine the diameter of the tool element.

5. A hand tool machine as defined in claim 1; and further comprising an electronic indicator for indication of the determined diameter of the tool element.

6. A hand tool machine as defined in claim 3; and further comprising an electronic odometer associated with the caliper.

7. A hand tool machine as defined in claim 2; and further comprising an electronic indicator associated with the readable indicator so that the determining means is optoelectronic determining means.

8. A hand tool machine as defined in claim 5, wherein the electronic indicator is provided with a digital display.

9. A hand tool machine as defined in claim 1, wherein the controlling means includes a control unit associated with the determining means and receiving a signal corresponding to the measured diameter of the tool element, and further comprising an input device associated with the control unit and administering information thereto in correspondence to the material to be treated with the hand tool machine, the control unit controlling the driving means in dependence on the combination of the administered information of the material and the determined diameter of the tool element.

10. A hand tool machine as defined in claim 4, wherein the caliper is provided with two jaws, one jaw being movable with respect to the other jaw and provided with the scale, the other jaw being constituted by a magnifying lens for permitting reading of the scale.

11. A hand tool machine as defined in claim 10, wherein the vernier is provided on the magnifying lens.

12. A hand tool machine as defined in claim 10, wherein the determining means further includes a spring having one end abutting the one jaw of the caliper and another end abutting the frame, said spring being provided for forcing the one jaw of the caliper to abut the other jaw thereof so as to force the caliper into its neutral position.

13. A hand tool machine as defined in claim 12; and further comprising an electric current supply, the caliper being formed so that its neutral position corresponds to the switch-off position for the electric current supply.

14. A hand tool machine as defined in claim 1; and further comprising a battery for supplying voltage to the determining and controlling means.

15. A hand tool machine as defined in claim 1, wherein the determining means includes a first member connected to the housing and having at least one opening, and a second member movable with respect to the first member and having at least a further opening cooperating with the one opening so as to allow the tool element to be inserted through the one and the further opening and to determine the diameter of the tool element depending on the movement of the second member with respect to the first member.

16. A hand tool machine as defined in claim 15; and further comprising an electric current supply wherein the determining means further includes a spring having one end connected to the housing and another end connected to the second member so as to force the second member into its neutral position with respect to the first member, which position corresponds to the switching-off position of the electric current supply.

17. A hand tool machine as defined in claim 15; and further including a spindle having a longitudinal axis, the first member being constituted by a first disk and the second member being constituted by a second disk covering the first disk, the second disk being connected to the spindle so as to be movable with respect to the first disk.

18. A hand tool machine as defined in claim 17, wherein the one opening provided in the first disk is circular in shape and the further opening provided in the second disk is wedge-shaped and extends around the longitudinal axis of the spindle symmetrically to a line defining an arc of a circle.

19. A hand tool machine as defined in claim 17, wherein the second disk is rotatable about the longitudinal axis of the spindle, the longitudinal axis being the center for the line defining an arc of a circle.

20. A hand tool machine as defined in claim 15, wherein the first member is constituted by an angle guide, and the second member is constituted by a band movable with respect to the angle guide.

21. A hand tool machine as defined in claim 20, wherein the band is linearly movable, the one opening of the angle guide being circular and the further opening provided in the band being wedge-shaped and symmetrically arranged with respect to a straight line in direction of the movement of the band.

22. A hand tool machine as defined in claim 21, wherein the band is flexible.

23. A hand tool machine as defined in claim 15, wherein the determining means further includes a resistance meter having a resistance bar and a sliding contact sliding on the bar so that depending on the relative movement between the first and the second member the sliding contact slides on the bar and provides a respective resistance value corresponding to the diameter of the tool element.

24. A hand tool machine as defined in claim 17, wherein the determining means further includes a resistance meter having a resistance bar and a sliding contact connected to the spindle and sliding on the bar so that depending on the relative movement between the first and the second member the sliding contact slides on the bar and provides a respective resistance value corresponding to the diameter of the tool element, and a pusher movable only around the longitudinal axis of the spindle so that upon inserting of the tool element through the one and the further opening and exerting pressure on the pusher by the inserted tool element, the pusher moves downwardly until the tool element is clamped by the simultaneous movement of the spindle and the second disk with respect to the first disk.

25. A hand tool machine as defined in claim 19, wherein the determining means further includes a resistance meter having a resistance bar and a sliding contact sliding on the bar so that depending on the relative movement between the first and the second member the sliding contact slides on the bar and provides the respective resistance value corresponding to the diameter of the tool element, and a swivel plate fixedly connected to the band and pivotally connected to the frame, the band being movable about a deflector roller which is connected to the sliding contact so that upon inserting of the tool element through the one and the further opening and exerting pressure on the swivel plate by the inserted tool element, the swivel plate moves forwardly the band until the tool element is clamped through the cooperation between the band and the angle guide.

26. A hand tool machine as defined in claim 1, wherein the determining means includes a first disk supported by an axle mounted to the housing and having one section provided with two rollers, one of the rollers being located above the axle the other of the rollers being arranged below the axle, a second semicircular disk supported by the axle and covering the other section of the first disk, the second disk being provided with two further rollers, one of the rollers being above the axle and the other of the rollers being arranged below the axle so that the upper roller of the first disk and the upper roller of the second disk and the lower rollerof the first disk and the lower roller of the second disk are spaced from and oppose each other, and a wedge-shaped member located between the lower roller of the first disk and the lower roller of the second disk, said wedge-shaped member having a tip pointing away from the axle.

27. A hand tool machine as defined in claim 26, wherein the first disk has a rear side, the determining means further includes a resistance meter having a resistance bar provided on the rear side, and a sliding contact connected to the axle and sliding along the bar so that upon relative movement between the first and second disks the sliding contact slides on the bar and provides a respective resistance value corresponding to the diameter of the tool element.

28. A hand tool machine as defined in claim 1; and further comprising means for classifying tool elements of different diameters in different groups, the classifying means being associated with the determining means.

29. A hand tool machine as defined in claim 28, wherein the classifying means includes a gauge provided with a plurality of recesses of different radii, each recess being associated with a respective switch so that upon insertion of a tool element fitting into the recess the switch is actuated.

30. A hand tool machine as defined in claim 29, wherein each of the plurality of recesses is provided with a switch pin having one end projecting into the recess and another end engageable with the respective switch so that upon insertion of the tool element fitting into the recess the switch is actuated by the switch pin which is depressed by the tool element.

31. A hand tool machine as defined in claim 29, wherein the recesses are semicircular.

32. A hand tool machine as defined in claim 29, wherein the recesses are cylindrically shaped.

33. A hand tool machine as defined in claim 28, wherein the classifying means includes a gauge provided with an indentation in which the tool element to be measured is insertable, the gauge being formed of a plurality of electrically conducting sections, each section being separated from another section by an insulating layer and associated with a respective electric circuit so that depending upon the depth of insertion of the tool element, the respective circuit is closed.

34. A hand tool machine as defined in claim 33, wherein the indentation is cone-shaped.

35. A hand tool machine as defined in claim 33, wherein the indentation is wedge-shaped.

36. A hand tool machine as defined in claim 33, wherein the gauge has one portion provided in one piece and another portion being formed by the plurality of electrically conducting sections.

37. A hand tool machine as defined in claim 1, wherein the determining means includes an inductive arrangement for determining the diameter of the tool element.

38. A hand tool machine as defined in claim 37, wherein the inductive arrangement includes a support body provided with two coils and defining a cavity in which the tool element to be measured is insertable, one of the two coils being connected to an AC voltage source and the other of the two coils being connected to a measuring circuit so that upon insertion of the respective tool element, the two coils are coupled and induce measuring results in the measuring circuit depending on the diameter of the tool element.

39. A hand tool machine as defined in claim 37, wherein the inductive arrangement includes a support body provided with one coil and defining a cavity in which the tool element to be measured is insertable, the coil being connected to an AC voltage source so that depending on the diameter of the inserted tool element, the inductivity is changed.

40. A hand tool machine as defined in claim 39, wherein the cavity is wedge-shaped.

41. A hand tool machine as defined in claim 39, wherein the inductive arrangement further includes a control pin having one end projecting into the cavity and another end engageable with a switch of a storage circuit so that upon insertion of a tool element, the control pin is depressed and actuates the switch.

42. A hand tool machine as defined in claim 9, wherein the controlling means further includes a measuring value transmitter storage. which stores an administered measuring value as long as the determining means transmits a new measuring value.

43. A hand tool machine as defined in claim 1, wherein the determining means is developed as an independent unit for subsequent equipment of the hand tool machine.

44. A hand tool machine for driving a tool element having a diameter, comprising: a housing; a clamping element connected to saidhousing for receiving the tool element; means for driving the tool element with a changeable speed; means for determining the diameter of the tool element, said determining means including a feeler member, which is arranged to receive the tool element for sensing the diameter of the tool element, said determining means with said feeler member being located at a predetermined part of said housing separate from said clamping element so that the determination of the diameter of the tool element takes place directly in the housing and at the same time separately from said clamping element; and controlling means connected with said feeler member and for controlling said driving means so as to change the speed of said driving means and thereby to change the speed of the tool element in dependence on the diameter determined by said feeler member.

45. A hand tool machine as defined in claim 1, wherein the tool element has a working diameter and said feeler member is arranged for sensing the working diameter of tool element.

* * * * *